United States Patent [19]

Wakefield

[11] Patent Number: 4,875,293
[45] Date of Patent: Oct. 24, 1989

[54] GOLF CLUB MEASURING DEVICE

[75] Inventor: Peter D. Wakefield, Gerrards Cross, England

[73] Assignee: Delfield Precision Engineering Limited, Southall, England

[21] Appl. No.: 121,348

[22] Filed: Nov. 16, 1987

[30] Foreign Application Priority Data

Nov. 17, 1986 [GB] United Kingdom ............... 8627419

[51] Int. Cl.⁴ ............................................. G01B 5/24
[52] U.S. Cl. ................................................... 33/508
[58] Field of Search ............................. 72/293; 33/508

[56] References Cited

U.S. PATENT DOCUMENTS 3,439,429  4/1969  Sundstrom .
4,094,072  6/1978  Erb .
4,622,836  11/1986  Long et al. ...................... 33/508 X
4,640,017  2/1987  Cukon ............................... 33/508

Primary Examiner—Harry N. Haroian
Attorney, Agent, or Firm—Michael J. Striker

[57] ABSTRACT

A golf club measuring device has clamping means for retaining a head of a golf club in a fixed reference position and measuring means for measuring the loft and/or lie of the club. The clamping means comprise a first jaw for clamping a striking face of the club head against a first reference surface and a second jaw for clamping a sole of the club head against a second reference surface. The device is conveniently designed to be able to measure the loft and/or lie of both right- and left-handed golf clubs.

4 Claims, 9 Drawing Sheets

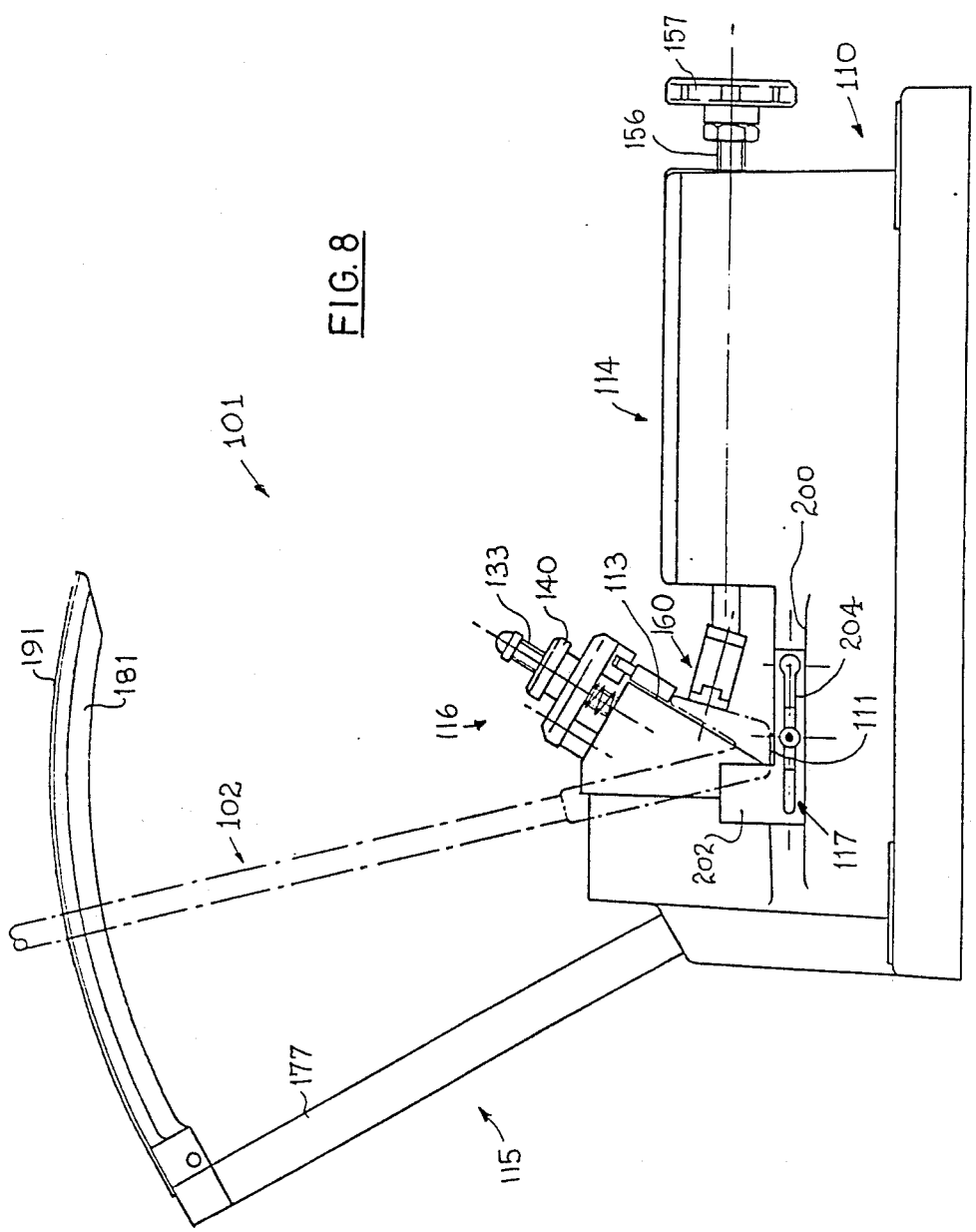

GOLF CLUB MEASURING DEVICE

FIELD OF THE INVENTION

This invention relates to a golf club measuring device of the kind comprising clamping means for releasably retaining a head of a golf club in a fixed reference position and measuring means for determining the inclination of the shaft of the golf club relative to the head. In particular the device is intended for measuring the "loft" and/or "lie" of an "iron" golf club and typically may also be used to enable adjustment of a golf club whilst the latter is clamped in the measuring device.

The "loft" of a golf club may be defined as the angle between the substantially flat striking face of the club head and a plane containing a first line substantially parallel to the shaft (usually along the side of the shaft in the direction of striking) and a second line along the forward edge of the sole of the club. Generally speaking this plane is normal to the ground when the golf ball is addressed. The "lie" of a golf club may be defined as the angle between said first and second lines which form the previously referred to plane.

DESCRIPTION OF RELATED ART

A golf club measuring device of the kind referred to is already known in U.S. Pat. No. 3,439,429. This known device uses a single clamping member operated by an hydraulic jack for retaining the golf club head in the fixed reference position. However, since there should be at least two reference means for locating the golf club head in the fixed reference position, the use of a single clamping member cannot be relied upon to provide a consistent clamp of the golf club head in the fixed reference position. In addition, the known device described in U.S. Pat. No. 3,439,429 can only be used for measuring and/or adjusting right-hand golf clubs. An additional, modified device would be required for measuring and/or adjusting lefthand golf clubs.

SUMMARY OF THE INVENTION

The present invention seeks to provide a golf club measuring device of the kind referred to which overcomes at least one of the problems associated with prior art golf club measuring devices.

According to one aspect of the present invention there is provided a golf club measuring device of the kind referred to wherein the clamping means comprises a first jaw movable to urge the striking face of the club head against first reference means and a second jaw movable to urge the sole of the club head against second reference means.

Conveniently the device includes third reference means for abutment against a part of the hosel of a golf club when the head of the latter is retained in its fixed reference position. In addition to providing an additional reference point, the third reference means also provides a bearing against which the hosel can be bent during adjustment of the lie and/or loft of a clamped golf club. Preferably either the third reference means is mountable in two positions on opposite sides of the other reference means or two third reference means are provided on opposite sides of the other reference means. This enables the third reference means to be used with either right- or left-handed golf clubs. The or each third reference means is preferably adjustably positionable.

Suitably at least one of the said first and second jaws comprises a pivoting or universally movable jaw. For example the first jaw conveniently comprises a pivoting jaw carried on a linearly movable carrier. In this case the pivoting jaw engages the top surface of the golf club head which slopes in different directions depending on whether a right- or left-handed golf club is being measured. Also by way of example the second jaw may conveniently comprise a floating or universally jointed jaw for enabling abutment against different rear surfaces of golf club heads.

According to a second aspect of the present invention there is provided a golf club measuring device comprising a base, clamping means for releasably retaining a golf club head in a fixed reference position and means for supporting loft- and lie-defining scales above the clamping means, wherein said supporting means are positioned or are positionable so that said scales can measure the loft and lie of both right-handed and left-handed golf clubs clamped by said clamping means.

BRIEF DESCRIPTION OF THE DRAWINGS

An embodiment of the invention will now be described, by way of example, with reference to the accompanying drawing, in which.

DETAILED DESCRIPTION OF 1ST EMBODIMENT OF THE INVENTION

Figure 1:
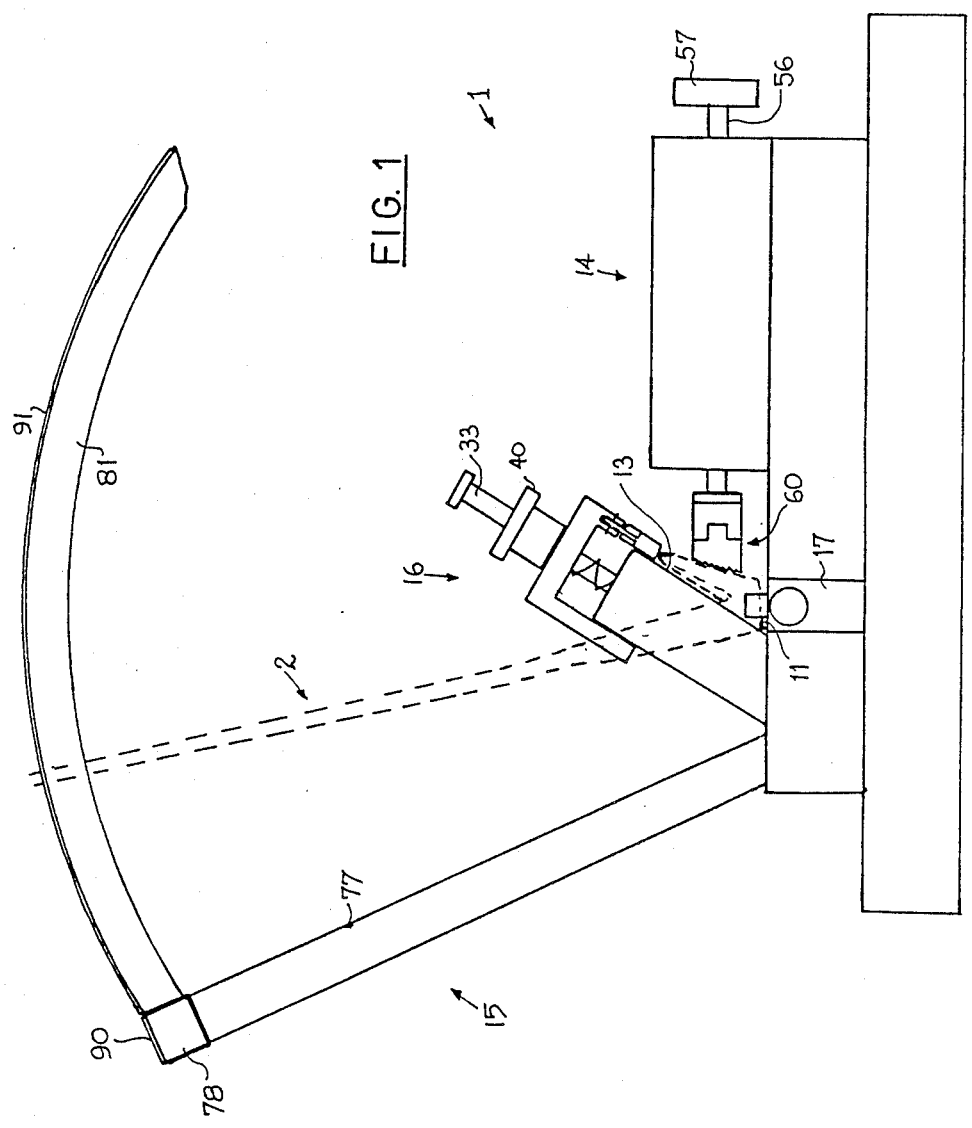
FIG. 1 is a side view of a golf club measuring device according to the invention.

FIGS. 1 to 4 show a device, generally designated by the reference numeral 1, for measuring the "lie" and the "loft" of iron golf clubs, for instance golf club 2 having a head 3, a shaft 4 and a hosel 5 connecting the shaft 4 to the head 3. The device 1 also enables a golf club head to be clamped in a fixed position whilst the shaft and hosel are adjusted to alter the lie and loft of the club. The head 3 of the golf club 2 has a striking face 6, a rear surface 7, a top surface 8 and a sole 9 (see FIG. 3).

The device includes a base 10 carrying a pair of spaced apart screws 11 whose heads establish a base line for supporting the sole 2, an abutment 12 having a flat reference surface 13 against which the striking face 6 is adapted to be clamped, a clamp generally designated 14, and a measuring device generally designated 15. The device 1 also includes a further clamp, generally designated 16, slidably mounted on the abutment 12 and a pair of hosel locating devices 17 and 19 mounted on the base 10.

The slide 16 comprises a channel-shaped slide member 24 slidably carried on the abutment 12 and having spaced apart high and low side walls 25 and 26, respectively. The wall 26 has an integral projection 27 on its inner surface which is slidably received in an open slot 29 formed in the rear surface of the abutment 12. A jaw member 31 is pivotally mounted on the wall 26 about a pivot 32 and forms an extension of the wall 26. A threaded bolt 33 is secured in a threaded bore 34 and passes through a non-threaded cylindrical hole in the "bottom" wall 84 of the channel-shaped slide 24. A helical spring 35 is positioned to surround the bolt 33 with one of its ends in contact with the inner surface of the bottom wall 84 and its other end contacting the bottom of a counterbore 36 formed in the abutment 12. The spring 35 is normally compressed and acts to resiliently urge the slide 24 away from the abutment 12 in direction A (see FIG. 3). A threaded knob 40 is threadedly received on the bolt 33 and has an abutment portion 41 which engages the outer surface of the bottom wall 84. By turning the knob 40, the slide 24 can be slid on the abutment 12 parallel to direction A.

The clamp 14 comprises a housing 50 having a stepped bore 51 (see FIG. 3) within which is received a stepped plunger 52. The plunger 52 has a ball-shaped front end portion 53 and a part-spherical recess 54 at its rear end. A helical spring 55 is received in the bore 51 and acts to urge the plunger 52 rearwardly in direction B (see FIG. 3). A threaded member 56 is threadedly received in a portion of the housing 50 and has a rounded front end received in the recess 54 and a knob 57 at its rear end turnable to control the movement of the plunger 52 parallel to direction B. A jaw member 60 is universally mounted on the end portion 53 and comprises a detachable two part carrier 61 partly surrounding the "ball" and a jaw piece 62 mounted on the carrier 61.

Figure 6:
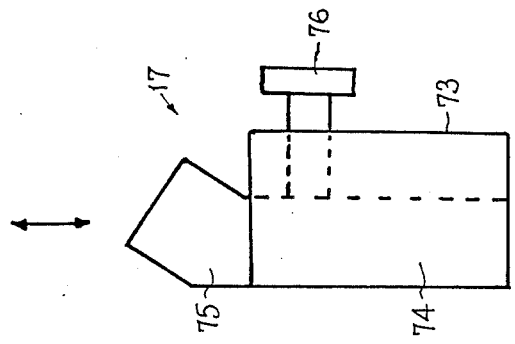

The hosel locating devices 17 and 19 are received in vertical slots 71 and 72 on opposite sides of the base 10. As can be seen in FIG. 6, each device 17 comprises a block 73 secured, e.g. by means of bolts (not shown), to the base 10 and having a vertical slot 74 formed in its inner surface. An abutment member 75 having an angled upper end is slidably received in the slot 74. The member 75 is locked in a desired position by a locking screw 76.

Figure 7:
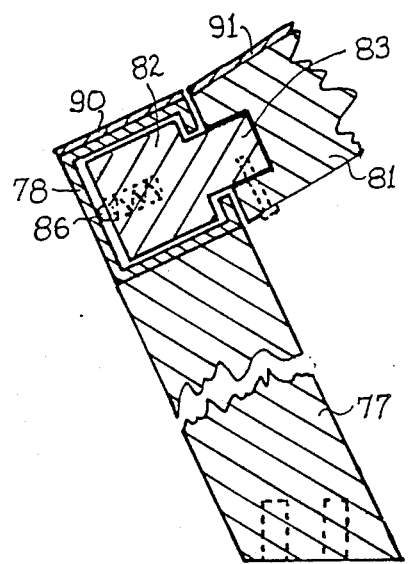
FIG. 7 is a sectional view, on an enlarged scale, through part of the measuring arms of the device shown in FIGS. 1 and 2.

The measuring device 15 comprises an upstanding support 77 disposed at an angle, e.g. $-65°$, to the horizontal and lying in a vertical plane 80 containing the longitudinal axis of the base 10 and a hollow cross arm 78 fixed to the upper end of support 77 and extending substantially horizontally equally on either side of the vertical plane 80. The cross arm 78 is straight and carries an arcuate arm 81 which lies parallel to the vertical plane 80 and which is slidable along the arm 78. A typical means of slidably mounting the arcuate arm 81 on the cross arm 78 is shown in FIG. 7. This mounting means comprises a member 82 slidably received within the hollow arm 81 and having a projecting part 83 extending through an elongate slot in the cross arm 78. A pair of spaced apart balls 86 are spring urged against an inner surface of the arm 78 to facilitate sliding of the member 82. The arcuate arm 81 is secured, e.g. bolted, to the projecting part 83.

A lie-defining scale 90 is provided on the crossarm 78 and a loft-defining scale 91 is provided on the arcuate arm 81. The scale 91 has a pointer 92 which is movable along scale 90 when the arcuate arm 81 is slidably moved along the cross arm 78.

Figure 2:
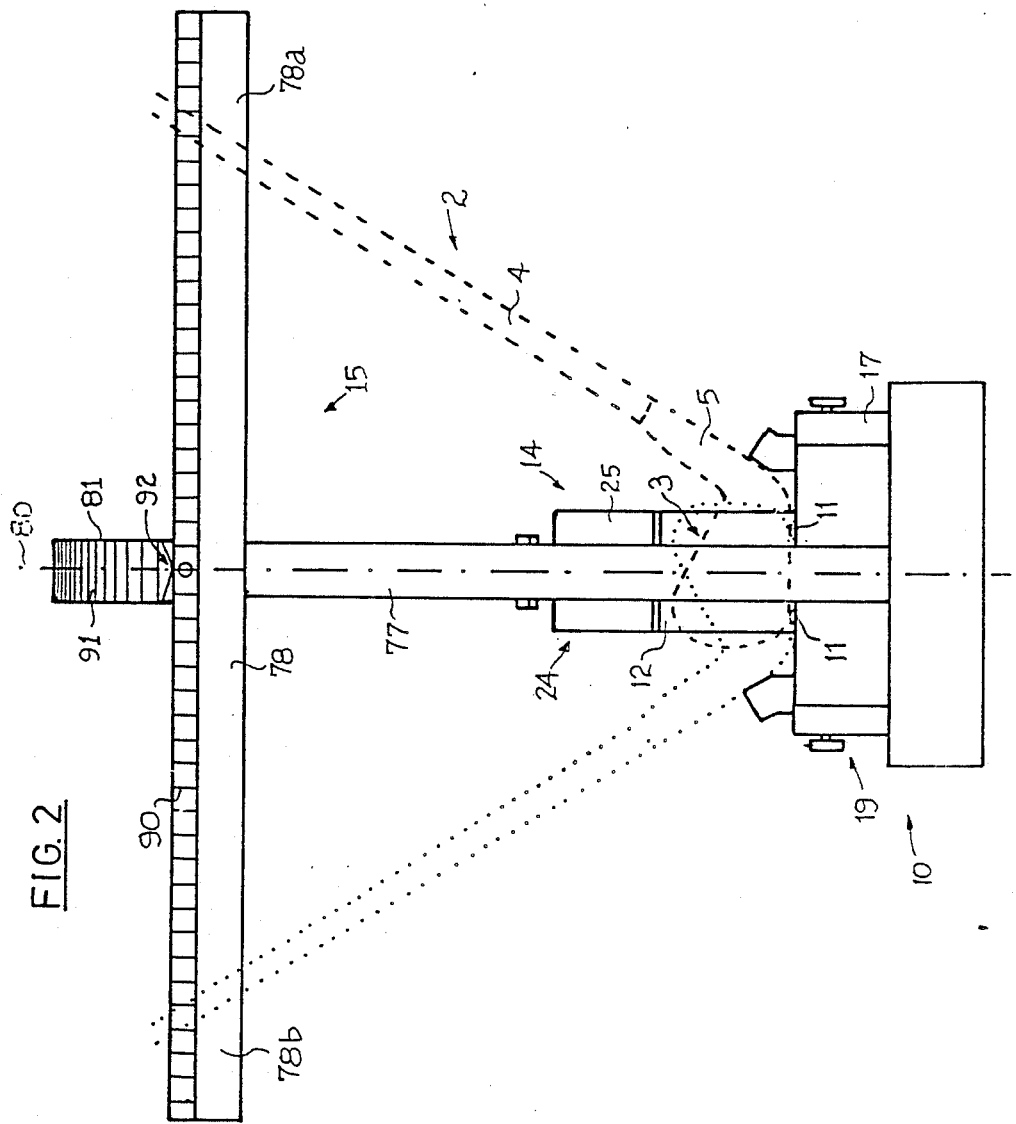
FIG. 2 is an end view of the measuring device shown in FIG. 1.

In use the head 3 of a golf club 2 is clamped in position by means of the clamps 14 and 16. The golf club head is so positioned that its striking face 6 is located against the reference surface 13 and its sole 9 is located on the heads of the spaced apart screws 11. The head 3 and hosel locating device 17 are also positioned so that the abutment member 75 contacts the hosel 5. The clamps 14 and 16 are then closed so that the jaw member 31 adapts itself to the slope of the top surface 8 and clamps the sole 9 against the screws 11 and the jaw member 60 adapts itself to the shape of the rear surface 7 and clamps the striking face against the surface 13. As can be seen in FIG. 2, the shaft 4 extends upwards at an angle to the vertical plane 80 between the arcuate arm 81 and a right-hand portion 78a of the cross arm 78.

In order to measure the loft and lie of the clamped club 2, the arcuate arm 81 is slid along the cross arm 78 to the right (as viewed in FIG. 2) until arm 81 contacts the shaft 4. The position of the shaft 4 against the scale 91 indicates the "loft" of the golf club 2 and the position of the pointer 92 against the scale 90 indicates the "lie" of the golf club.

If it is required to adjust the lie and loft of the golf club 2, this is achieved with the club in its clamped condition. The clamps 14 and 16 and the hosel locating device 17 ensure that the head 3 and hosel 5 are retained in a desired position during bending, e.g. by means of a wrench, of the hosel 5. The abutment member 75 may be used as a fulcrum for bending or shaping the hosel to alter the inclination of the shaft thereby adjusting the lie and the loft of the golf club.

It will be appreciated that the two clamps 14 and 16 provide strong, accurate and simple clamping of a golf club head. The pivotal mounting of the jaw member 31 on the slide member 24 ensures that the jaw member 35 is able to adapt itself to golf clubs having different angles of their top surfaces 8. Also the universal mounting of the jaw member 60 ensures that the jaw member 60 can also adapt itself to differently contoured rear surfaces 7 of golf clubs. This enables the whole range of iron clubs to be accurately measured and/or adjusted and even makes it possible for left-handed golf clubs to be measured and/or adjusted in the device 1. In this latter case the hosel locating device 19 is brought into use instead of device 17 and the shaft of a clamped club extends up between a left-hand portion 78b of the arm 78.

In other embodiments of a device according to the invention, a single hosel locating device could be provided which would be removably mounted on the desired side of the base for the golf club being measured or adjusted. It is also possible to provide a differently designed measuring device 15 mountable in two positions—i.e. one position for right-handed golf clubs and the other position for left-handed golf clubs.

BRIEF DESCRIPTION OF FURTHER DRAWINGS

Figure 3:
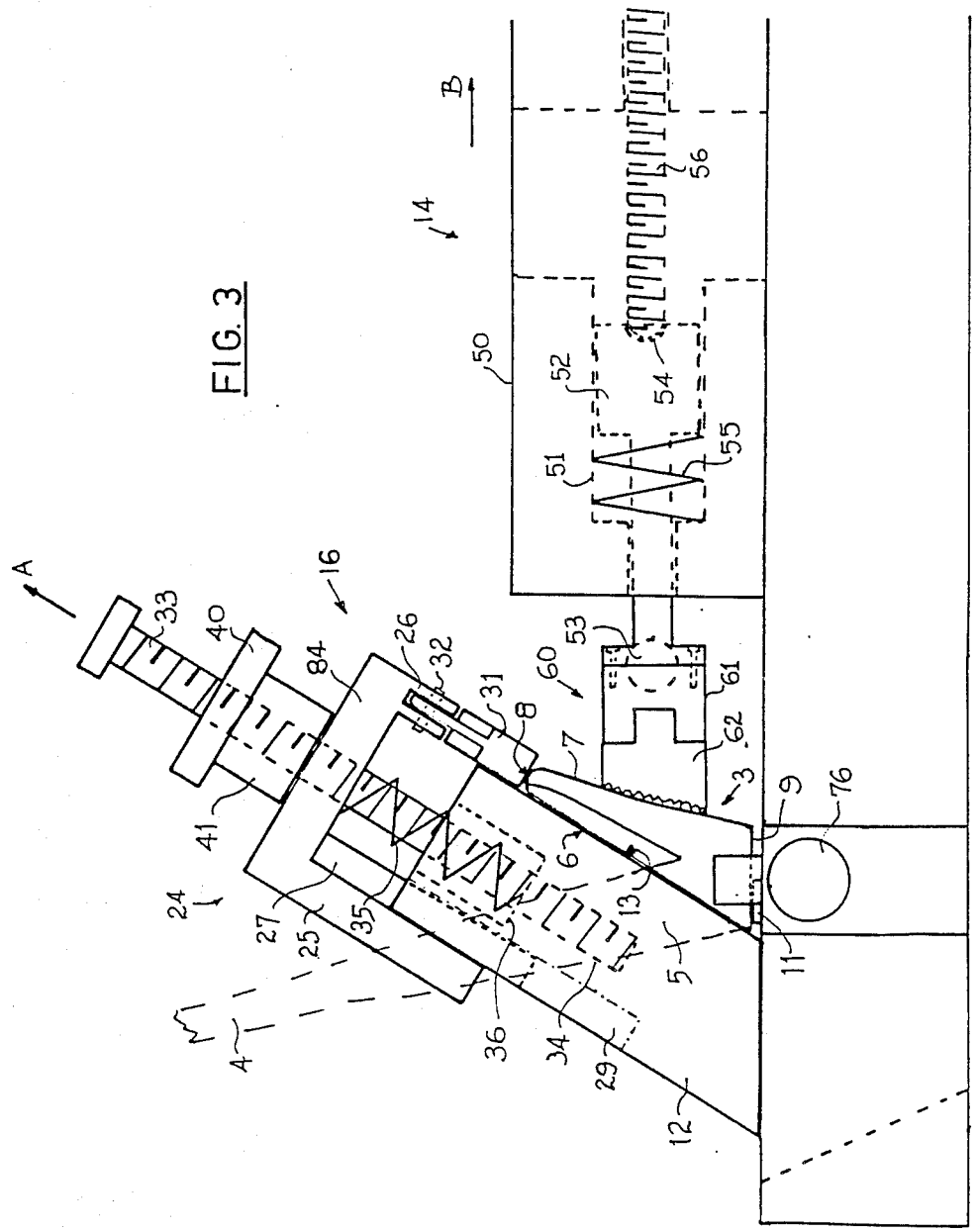
FIG. 3 is a side view, on an enlarged scale, of club head clamping means of the device shown in FIGS. 1 and 2.
Figure 4:
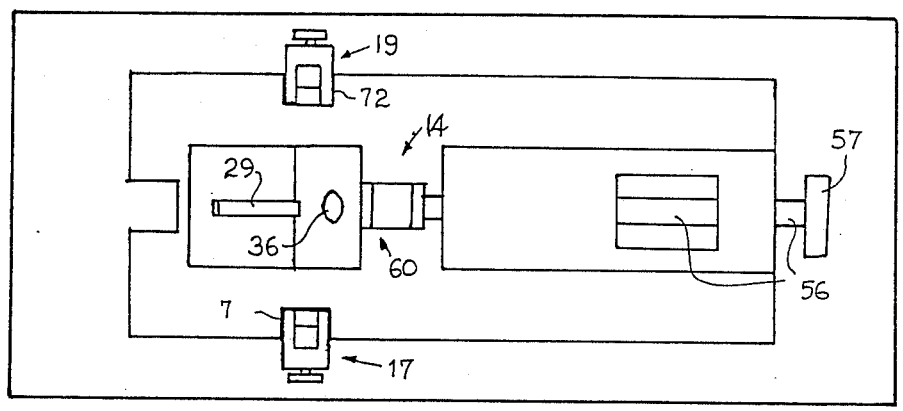
FIG. 4 is a plan of the device shown in FIGS. 1 and 2 but with one of its clamping jaws and its measuring arms removed.
Figure 5:
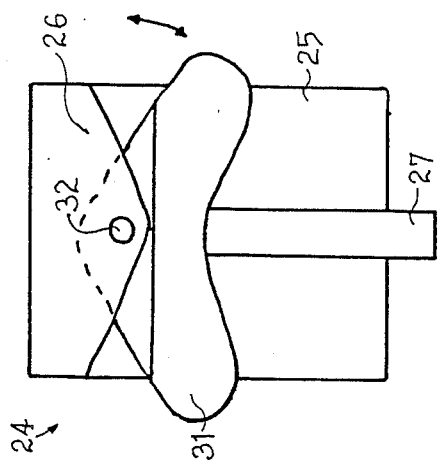
FIGS. 5 and 6 are views, on enlarged scales, of a clamping jaw and an abutment member, respectively, of the device shown in FIGS. 1 and 2.
Figure 9:
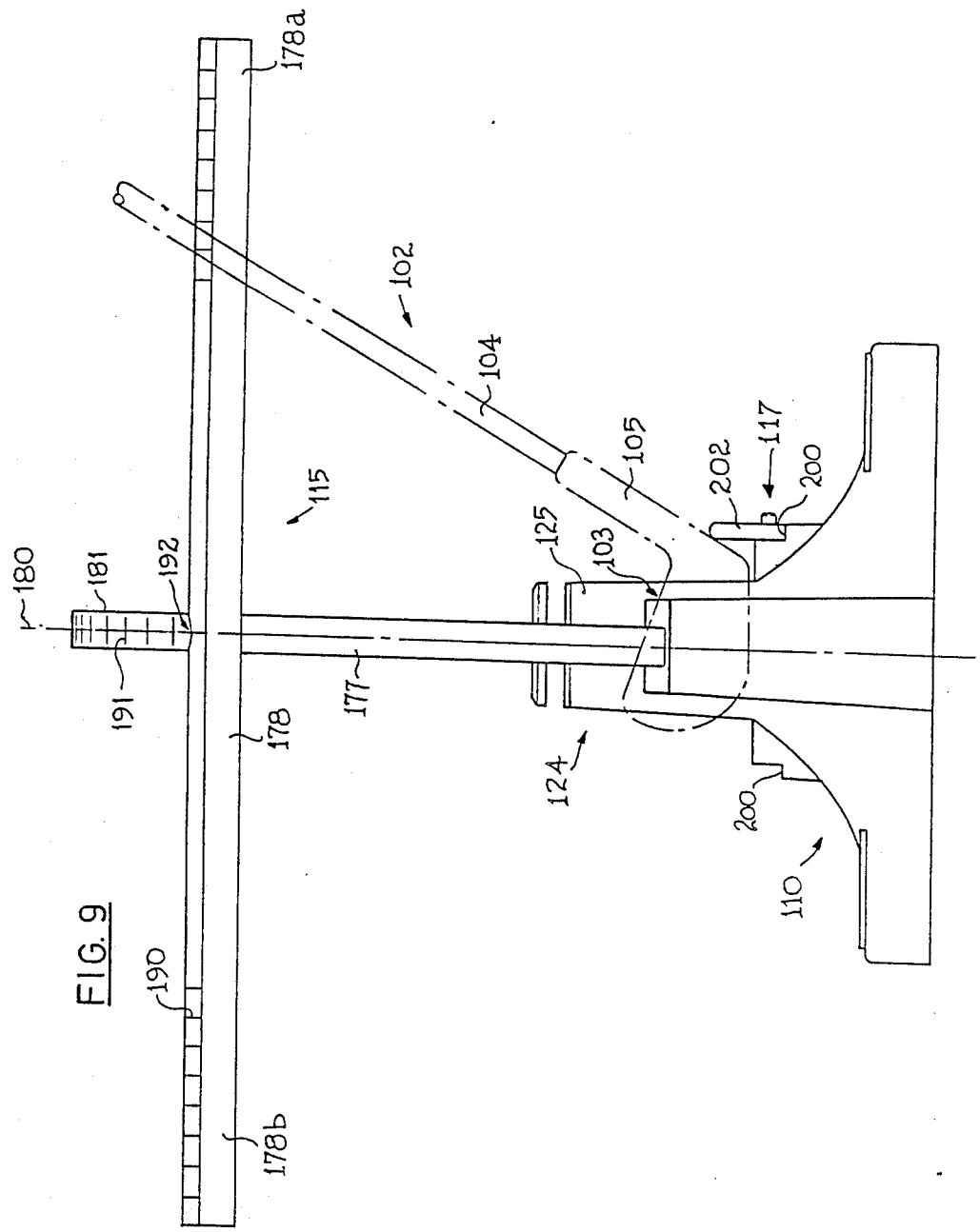
Figure 10:
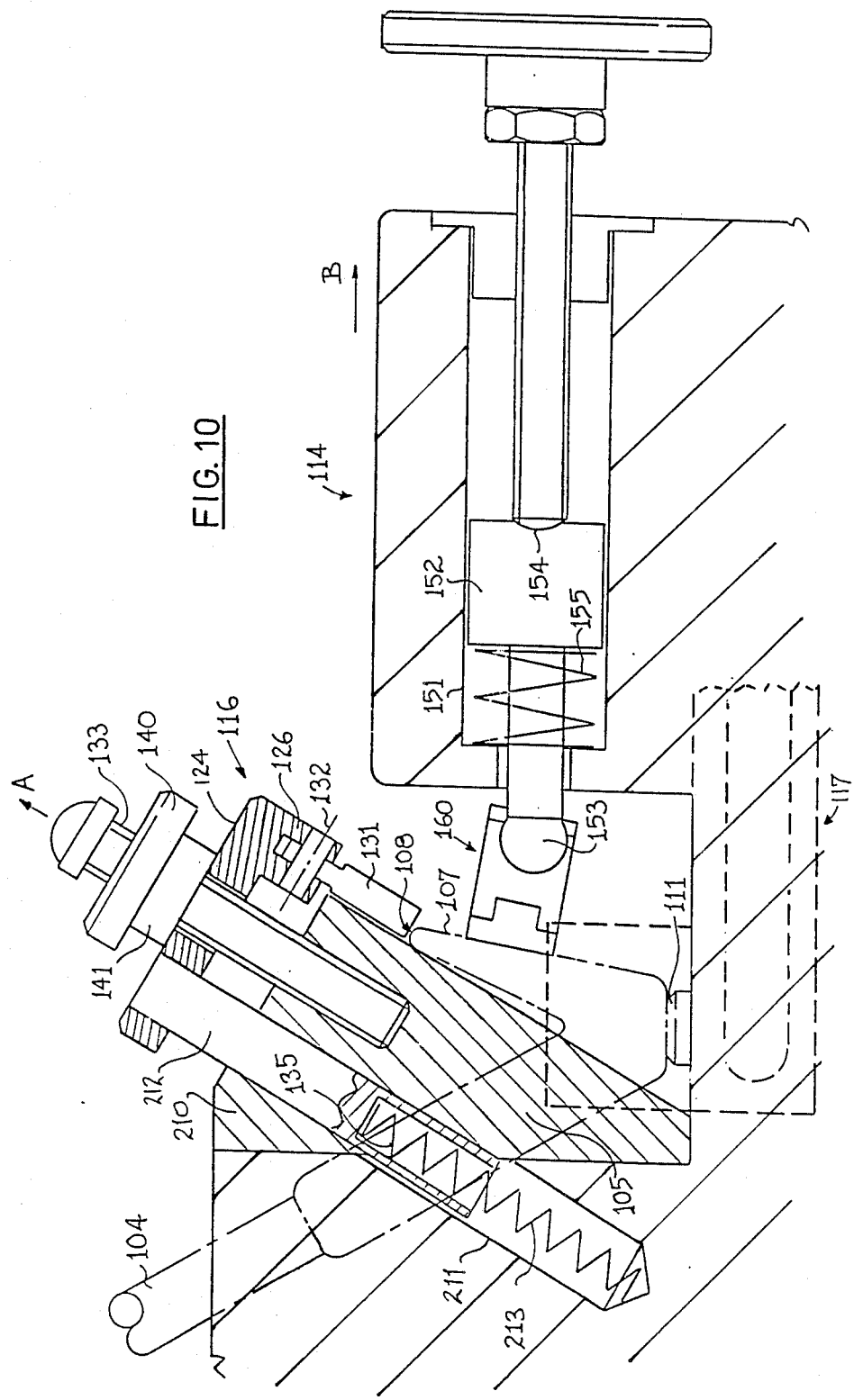
Figure 11:
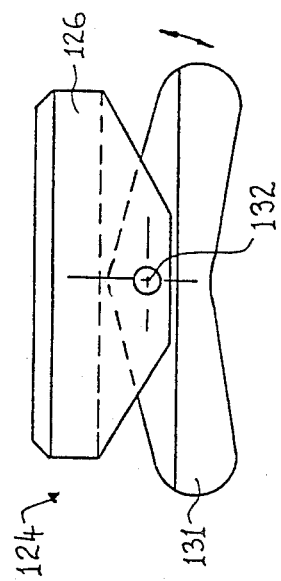
Figure 12:
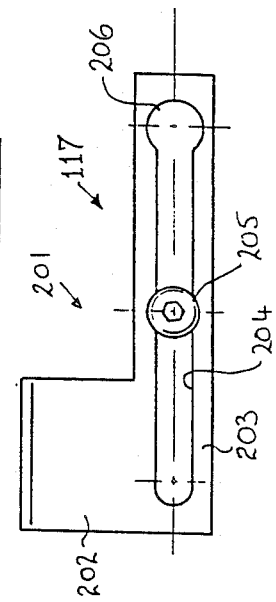
Figure 13:
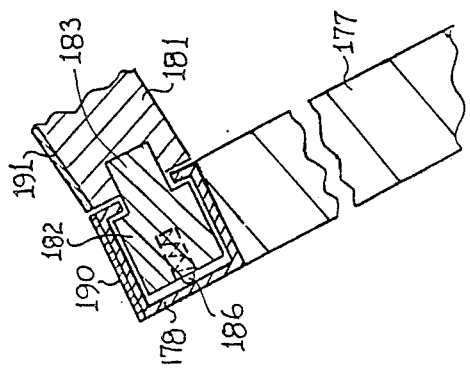

FIGS. 8–13 illustrate another embodiment of a golf club measuring device according to the invention, FIGS. 8 to 10 corresponding to views similar to those shown in FIGS. 1 to 3, respectively, of the first embodiment and FIGS. 11 to 13 corresponding to views similar to those shown in FIGS. 5 to 7, respectively, of the first embodiment.

DETAILED DESCRIPTION OF 2ND EMBODIMENT OF INVENTION

In FIGS. 8–13 there is shown another embodiment of a golf club measuring device 101 according to the invention. The device 101 is similar to the previously described device 1 and where possible reference numerals plus one hundred have been used to identify parts in FIGS. 8-13 which correspond with parts in FIGS. 1-7 (i.e. device 1 in FIGS. 1-7 is equivalent to device 101 (1+100) in FIGS. 8-13).

The device 101 is virtually identical to the device 1 and will not be described in great detail herein. However it is worth noting some of the differences between the two golf club measuring devices.

Firstly the hosel locating device 117 is horizontally slidable on a ledge 200 (see FIG. 8) integrally formed on the base 110. The device 117 comprises an L-shaped member 201 (see FIG. 12) having a short upwardly extending arm 202 for locating the hosel 105 and a long arm 203 having an elongate slot 204 formed therein. An adjusting screw or bolt 205 is received in the slot 204 to enable adjustment of the position of the device 117. The slot 204 has an enlarged opening 206 at one end to enable removal of the device 117 so that it can be repositioned on the opposite side of the base 110 for use with left-handed golf clubs.

It will be appreciated that the base 110 has a different shape to that of base 1 as can be seen in FIGS. 8 and 9. Also the clamp 116 is mounted for sliding movement on the base 110 in a different manner. In particular the jaw member 131 (see FIG. 10) is carried on a member 124 whose position relative to part 210 of base 110 is adjustable by means of bolt 133 and knob 144. An angled bore 211 in which there is slidably received a pin 212 fixed to the member 124 serves to guide the member 124 during adjustment of its position. A spring 213 provides a spring force in direction A.

Other minor differences between the devices 1 and 101 are readily apparent from the drawings. Thus, for example, jaw member 160 is shown positioned at an angle and the arcuate arm 181 subtends a smaller angle.

I claim:

1. A golf club measuring device comprising clamping means for releasably retaining a head of a gold club in a fixed reference position and measuring means for determining the inclination of the shaft of the golf club relative to the head, wherein the clamping means comprises a first movable jaw to urge a striking face of the club head against first reference means and a second jaw movable to urge a sole of the club head against second reference means, third reference means for abutment against a part of a hosel of a golf club when the head of the latter is retained in its fixed reference position, and mounting means for mounting the third reference means in either of two positions on opposite sides of the other reference means.

2. A device according to claim 1, in which the said mounting means make the third reference means to be adjustably positionable.

3. A golf club measuring device comprising clamping means for releasably retaining a head of a golf club in a fixed reference position and measuring means for determining the inclination of the shaft of the golf club relative to the head, wherein the clamping means comprises a first movable jaw to urge a striking face of the club head against first reference means and a second jaw mobable to urge a sole of the club head against second reference means, two third reference means mounted on opposite sides of the other reference means, one of the third reference means being arranged for abutment against a part of a hosel of a right-handed golf club when the latter is retained in its fixed reference position and the other of the third reference means being arranged for abutment against a part of a hosel of a left-handed golf club when the latter is retained in its fixed reference position.

4. A device according to claim 3, in which each third reference means is adjustably positionable.

* * * * *